United States Patent
Francois et al.

(10) Patent No.: US 9,251,478 B2
(45) Date of Patent: Feb. 2, 2016

(54) PROCESSING INFORMATION QUERIES IN A DISTRIBUTED INFORMATION PROCESSING ENVIRONMENT

(71) Applicant: Amadeus S.A.S., Sophia Antipolis (FR)

(72) Inventors: Pierrick Francois, Antibes (FR); Jacques Bonaud, Cagnes-sur-mer (FR)

(73) Assignee: AMADEUS S.A.S., Biot (FR)

( * ) Notice: Subject to any disclaimer, the term of this patent is extended or adjusted under 35 U.S.C. 154(b) by 233 days.

(21) Appl. No.: 13/953,148

(22) Filed: Jul. 29, 2013

(65) Prior Publication Data

US 2015/0032486 A1      Jan. 29, 2015

(51) Int. Cl.
G06F 17/30    (2006.01)
G06Q 10/02    (2012.01)
G06Q 30/06    (2012.01)

(52) U.S. Cl.
CPC ............ G06Q 10/02 (2013.01); G06Q 30/0635 (2013.01)

(58) Field of Classification Search
CPC ................. G06F 17/30902; G06F 17/30457; G06F 17/3048; G06Q 10/02; G06Q 10/025; G06Q 30/0256; G06Q 30/00; G06Q 30/0206; G06Q 50/14
USPC ......... 707/999.003, E17.12, 661, 705; 705/5, 705/6, 14.54, 7.35; 1/1; 345/557; 711/137, 711/118
See application file for complete search history.

(56) References Cited

U.S. PATENT DOCUMENTS

| | | | |
|---|---|---|---|
| 7,668,740 B1 * | 2/2010 | Baggett et al. | 705/5 |
| 8,781,864 B2 * | 7/2014 | De Marcken | 705/5 |
| 2002/0087366 A1 * | 7/2002 | Collier et al. | 705/5 |
| 2003/0187851 A1 * | 10/2003 | Fay | G06F 17/30902 |
| 2004/0054751 A1 * | 3/2004 | Weissert | G06Q 10/02 709/217 |
| 2004/0249799 A1 * | 12/2004 | Demarcken et al. | 707/3 |
| 2006/0149713 A1 * | 7/2006 | Walker | 707/3 |
| 2007/0055555 A1 * | 3/2007 | Baggett et al. | 705/5 |
| 2007/0192300 A1 * | 8/2007 | Reuther | G06F 17/30427 |
| 2007/0260495 A1 * | 11/2007 | Mace et al. | 705/5 |
| 2008/0167973 A1 * | 7/2008 | De Marcken | 705/27 |
| 2008/0262878 A1 * | 10/2008 | Webby | G06Q 10/02 705/5 |

(Continued)

OTHER PUBLICATIONS

Beitzel S M et al: "IIT Intranet Mediator: bringing data together on a corporate intranet" IT Professional, IEEE Service Center, Los Alamitos, CA, US, vol. 4, No. 1, Jan. 1, 2002, pp. 49-54, XP011094373 ISSN: 1520-9202.

(Continued)

*Primary Examiner* — Dennis Truong
(74) *Attorney, Agent, or Firm* — Thompson Hine LLP

(57) ABSTRACT

Methods, apparatus, and computer program products for handling or managing delayed answers to shopping requests directed to travel content provider platforms. A query processing server of a travel reservation system receives a multi-provider shopping request from an inquiring entity, such as a travel agency, and directs it to a content provider platform, such a platform of a rental car agency. If the content provider platform responds within a given time limit, the query processing server forwards the response to the inquiring entity and updates cache data based upon the response. If the content provider platform does not respond within the given time limit, the query processing server forwards a cache-based response to the inquiring entity. If the content provider platform responds after the given time limit has exceeded, the query processing server updates the cached data to reflect to the belated response from the content provider platform.

20 Claims, 12 Drawing Sheets

(56) References Cited

U.S. PATENT DOCUMENTS

| | | | |
|---|---|---|---|
| 2009/0078757 A1* | 3/2009 | Hanson et al. | 235/380 |
| 2009/0234682 A1* | 9/2009 | Baggett et al. | 705/6 |
| 2010/0153143 A1* | 6/2010 | Baggett | G06Q 10/02 705/5 |
| 2010/0305983 A1* | 12/2010 | De Marcken | 705/5 |
| 2011/0047120 A1* | 2/2011 | Kamvar et al. | 706/50 |
| 2012/0110110 A1* | 5/2012 | Luna | H04L 67/22 709/213 |
| 2012/0203578 A1* | 8/2012 | Baggett et al. | 705/5 |
| 2012/0284356 A1* | 11/2012 | Luna | G06F 17/30902 709/213 |
| 2012/0330693 A1* | 12/2012 | Ciabrini et al. | 705/5 |
| 2014/0089248 A1* | 3/2014 | Lataille | G06Q 10/02 706/47 |
| 2014/0379389 A1* | 12/2014 | Bornat | G06Q 10/02 705/5 |

OTHER PUBLICATIONS

J Wang, A survey of web caching schemes for the Internet, ACM SIGCOMM Computer Communication Review, Oct. 1, 1999, vol. 29 No. 5.

Dreilinger D et al., "Experiences with selecting search engines using metasearch" ACM Transactions on Information Systems, Association for Computing Machinery, 2 Penn Plaza, Suite 701 New York, NY 10121-0701, vol. 15 Issue 3, Jul. 1997, pp. 195-222.

European Patent Office, search report issued in application No. 13290174.5 dated Apr. 8, 2014.

* cited by examiner

| Information query / response ID 12345 -- last response received 21 May 2013 at 12:43 | | | | | | | |
|---|---|---|---|---|---|---|---|
| | 0 – 5 min | 5 – 10 min | 10 – 15 min | 15 – 30 min | 30 min – 1 h | 1 – 4 h | 4 – 10 h |
| Accuracy parameter | 99% | 98% | 97% | 97% | 95% | 92% | 70% |
| Confidence factor | 200 | 180 | 160 | 160 | 20 | 10 | 10 |

FIG. 8

PROCESSING INFORMATION QUERIES IN A DISTRIBUTED INFORMATION PROCESSING ENVIRONMENT

BACKGROUND

The present invention generally relates to methods and apparatus for handling information queries in distributed information processing environment and, more specifically, to methods, apparatus, and computer program products for managing delayed responses to shopping requests directed from a travel reservation system to one or more content provider platforms.

Distributed information processing systems are employed for various commercial applications such as distributed database systems, search machines, e-commerce platforms, travel portals, comparison shopping platforms and the like. FIG. 1 depicts a high-level architecture of a distributed search machine system. The distributed search system 1 generally includes of inquiring entities 2, a search engine 6 and content provider platforms 3. In the example of a search machine, the inquiring entities 2 are e.g., client computers which direct search queries to the search engine 6. The search engine 6 processes the queries and collects the respective answers from the content provider platforms 3, i.e., web servers throughout the Internet in the search machine example. The search engine 6 returns responses to the inquiring entities 2.

Such distributed information processing systems often utilize caches. Caches are generally employed to store responses to be returned to the inquirer in order to accelerate the query process. For example, with respect to search machines, crawling the Internet in a synchronous manner in response to particular search queries would be far too slow. Thus, the inquirer receives responses from the cache which has been filled with response data beforehand, i.e., asynchronously to the occurrence of particular queries. As a downside of this cache-based approach, the responses returned to the inquirers may not reflect the current data of the content provider platforms. If the content provider platforms' data has changed between the last cache update, the response returned to the inquirer may be outdated.

An exemplary message flow occurring in a classical distributed information processing system without utilization of a cache is shown by FIG. 2 (which, like FIG. 1, relates to the example of a search machine). First, an inquiring entity 2 such as a client computer issues an information query 20 to search engine 6. The search engine 6 processes this request at 21 and possibly splits it up into two information queries, each of them to be directed to a different content provider platform 3. In view of this distributional activity, search engine 6 is more generally referred to as distribution unit 6 in the context of the present invention and the subsequent examples.

Query 22 is sent to content provider platform A, whereas query 23 is transmitted to content provider platform B. The search engine 6 then has to wait for the feed-back from the content provider platforms 3 in order to generate the overall response to the inquiring entity 2. In the example of FIG. 2, content provider platform B responds instantaneously with response 24. However, search engine 6 also requires a response from content provider platform A to answer request 20. Hence, it waits for this response at 25. The response 26 from content provider platform A then finally arrives at some later point of time. Search engine 6 generates combined response 27 from the two messages 24 and 26 and forwards it to the inquiring entity 2.

As illustrated by this simple example, the time between the inquiring entity's request 20 and the response 27 strongly depends on the responsiveness of the content provider platforms 3. In systems where search engine 6 needs responses from all content provider platforms 3 in order to generate combined response 27, the waiting time for inquiring entity 2 is determined by the slowest content provider platform 3. The responsiveness of content provider platforms may depend on various factors such as their hardware and software configuration, their current load, the amount of processing needed to answer the query etc., all of which may vary among the content provider platforms 3 at the time of arrival of a particular query from search engine 6. From the perspective of the inquiring entity 2, the time duration until reception of response 27 is unpredictable and not transparent. There is no guarantee whether and when a response to its request will arrive.

Time delays of this nature may be particularly troublesome in a travel search environment. A shopping request communicated from an inquiring entity, such as a travel agency, to a travel reservation system often invokes the need to query multiple travel content providers. The multi-provider shopping requests is parsed by the travel reservation system into a single provider shopping request that is forwarded to multiple travel content providers. The travel reservation system aggregates the various different shopping responses received from the travel content providers and then communicates a unified shopping message or response back to the inquiring entity that originated the multi-provider shopping request. In the car rental realm of travel search, the unified message may provide, for example, rates for multiple rental locations, multiple rental dates, multiple car rental companies, and even multimedia content.

The effective reaction time of the travel reservation system to a multi-provider shopping request is impacted by the need to wait on responses from slower travel content providers with lengthy response times. Prompt responses received from fast travel content providers are effectively delayed until the belated responses are received from the slow travel content providers.

Methods, apparatus, and computer program products are needed that provide a predictable and selectable timing requirement for inquiring entities in response to their travel shopping requests.

BRIEF SUMMARY

According to an embodiment, a method is provided for handling information queries in a distributed information processing environment. The method includes receiving the information query from an inquiring entity at a query processing server, and directing the information query from the query processing server to a first content provider platform. If the first content provider platform fails to respond to the query processing server within a given time limit, a first response to the information query based upon query response data stored in a cache at the query processing server is forwarded from the query processing server to the inquiring entity. If the first content provider platform responds to the query processing server with a second response after the given time limit has been exceeded, the query response data for the first content provider in the cache at the query processing server is updated according to the second response.

In another embodiment, a method is provided for handling a shopping request at a travel reservation system. The method includes receiving the shopping request from an inquiring entity at a query processing server of the travel reservation system, directing the shopping request from the query processing server to a first platform of a first rental car agency. If the query processing server receives a first response to the shopping request from the first platform within a given time limit, the first response is forwarded from the query processing server to the inquiring entity. If the first platform fails to respond to the query processing server within a given time limit, a second response to the shopping request is forwarded from the query processing server to the inquiring entity based upon query response data stored in a cache at the query processing server. If the query processing server receives a third response to the shopping request from the first platform after the given time limit has been exceeded, the query response data for the first rental car agency is updated in the cache at the query processing server based upon the third response.

In another embodiment, an apparatus includes a processor, a cache coupled with the processor, and a memory coupled with the processor. The memory includes instructions that, when executed by the processor, cause the apparatus to receive the shopping request from an inquiring entity, direct the shopping request to a first platform of a first rental car agency, forward the first response to the inquiring entity if a first response to the shopping request is received from the first platform within a given time limit, forward a second response to the shopping request to the inquiring entity based upon query response data stored in the cache if the first platform fails to respond to the query processing server within a given time limit, and update the query response data for the first rental car agency in the cache based upon the third response if a third response to the shopping request is received from the first platform after the given time limit has been exceeded.

In another embodiment, a computer program product includes a computer readable storage medium and instructions stored on the computer readable storage medium that, when executed by a processor of a query processing server, cause the processor to receive a shopping request from an inquiring entity, direct the shopping request to a platform of a rental car agency, forward the first response to the inquiring entity if a first response to the shopping request is received from the platform within a given time limit, forward a second response to the shopping request to the inquiring entity based upon query response data stored in a cache if the platform fails to respond within a given time limit, and update the query response data for the rental car agency in the cache based upon the third response if a third response to the shopping request is received from the first platform after the given time limit has been exceeded.

BRIEF DESCRIPTION OF THE SEVERAL VIEWS OF THE DRAWINGS

The present invention will be described with reference to the accompanying figures. Similar reference numbers generally indicate identical or functionally similar features.

FIG. 8 gives an example for an accuracy table of a particular cached information query response.

DETAILED DESCRIPTION

Figure 1:
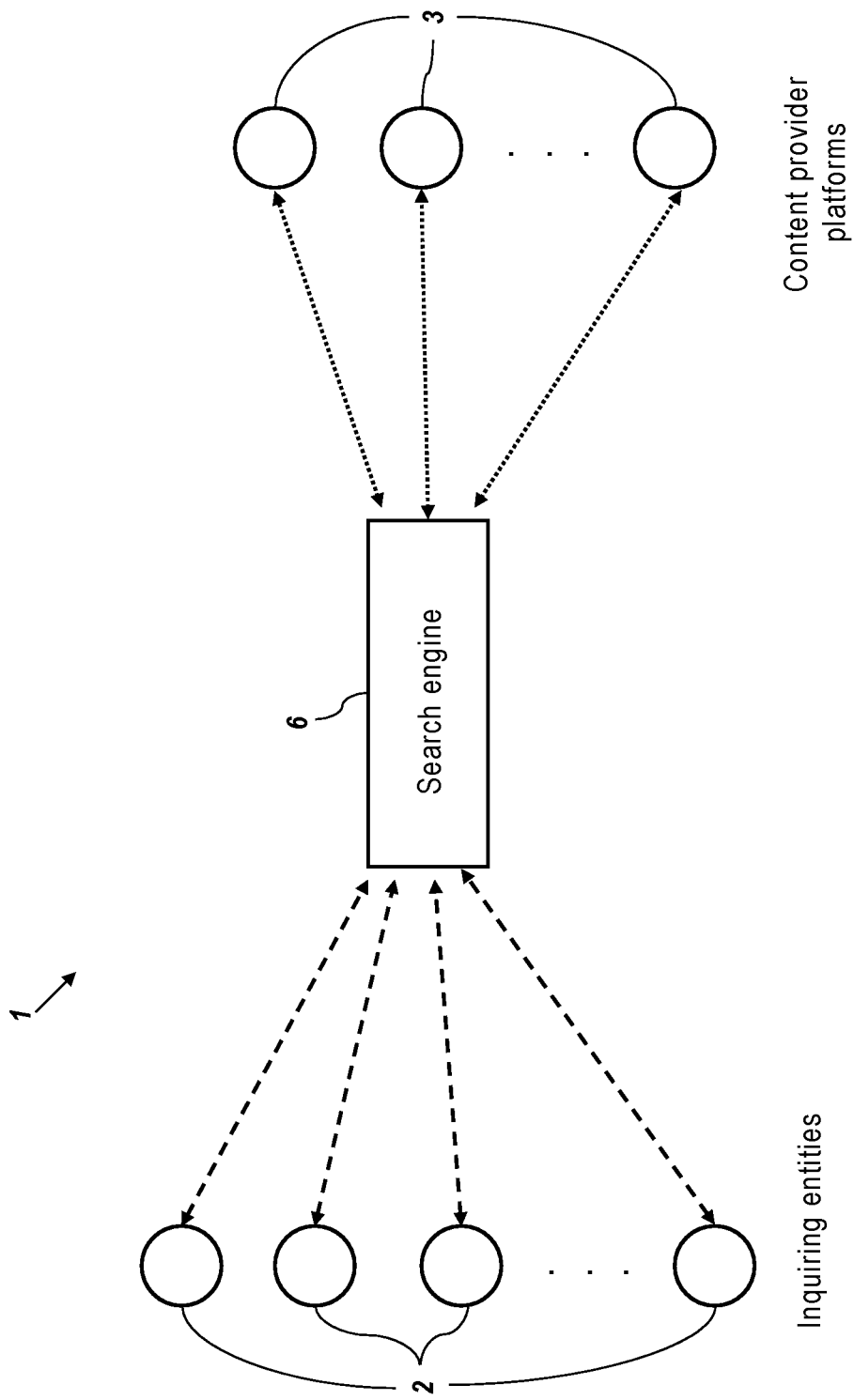
FIG. 1 schematically shows a distributed information processing system without a query processing server and in accordance with the prior art.
Figure 2:
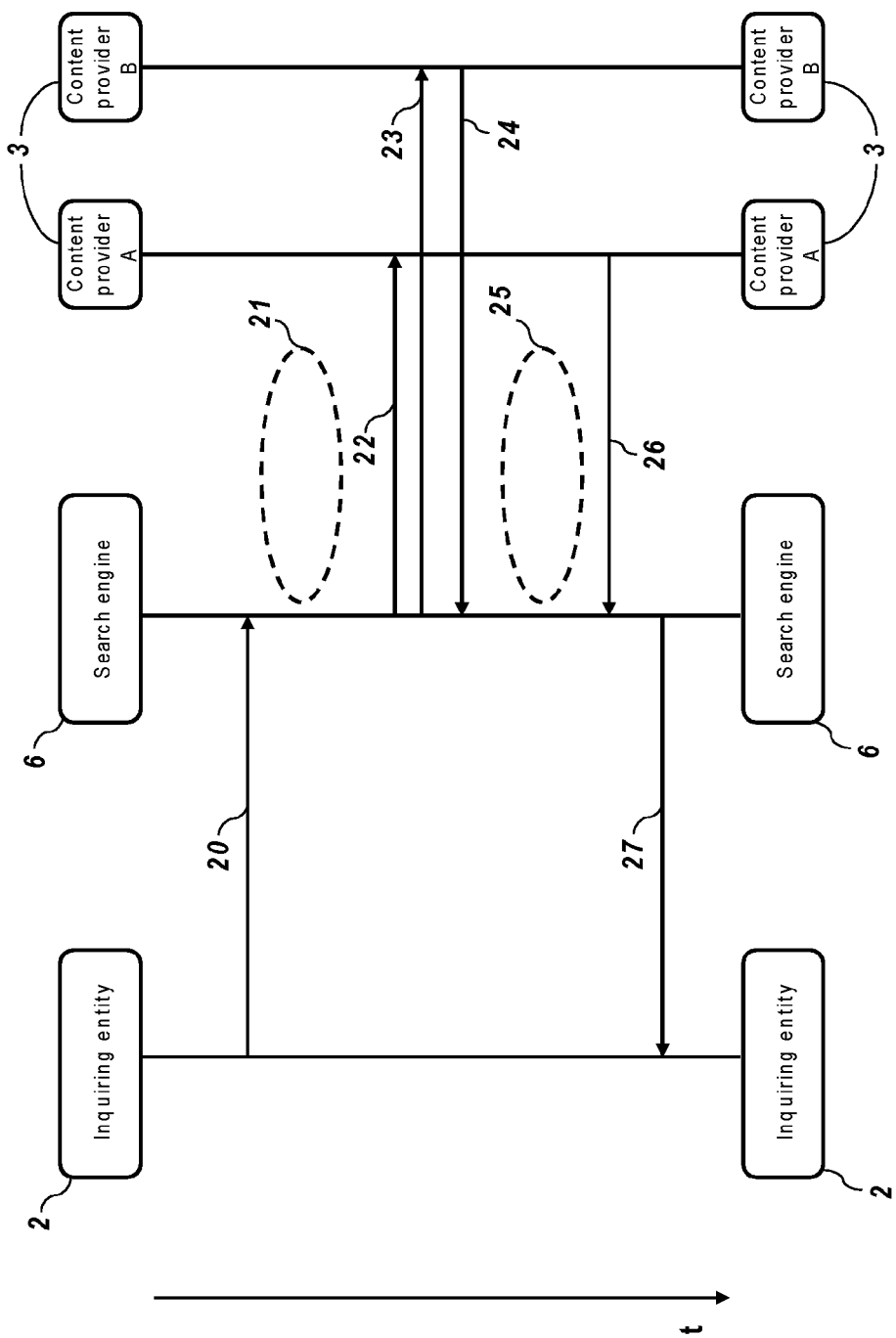
FIG. 2 illustrates an exemplary message flow within the prior art system of FIG. 1.
Figure 3:
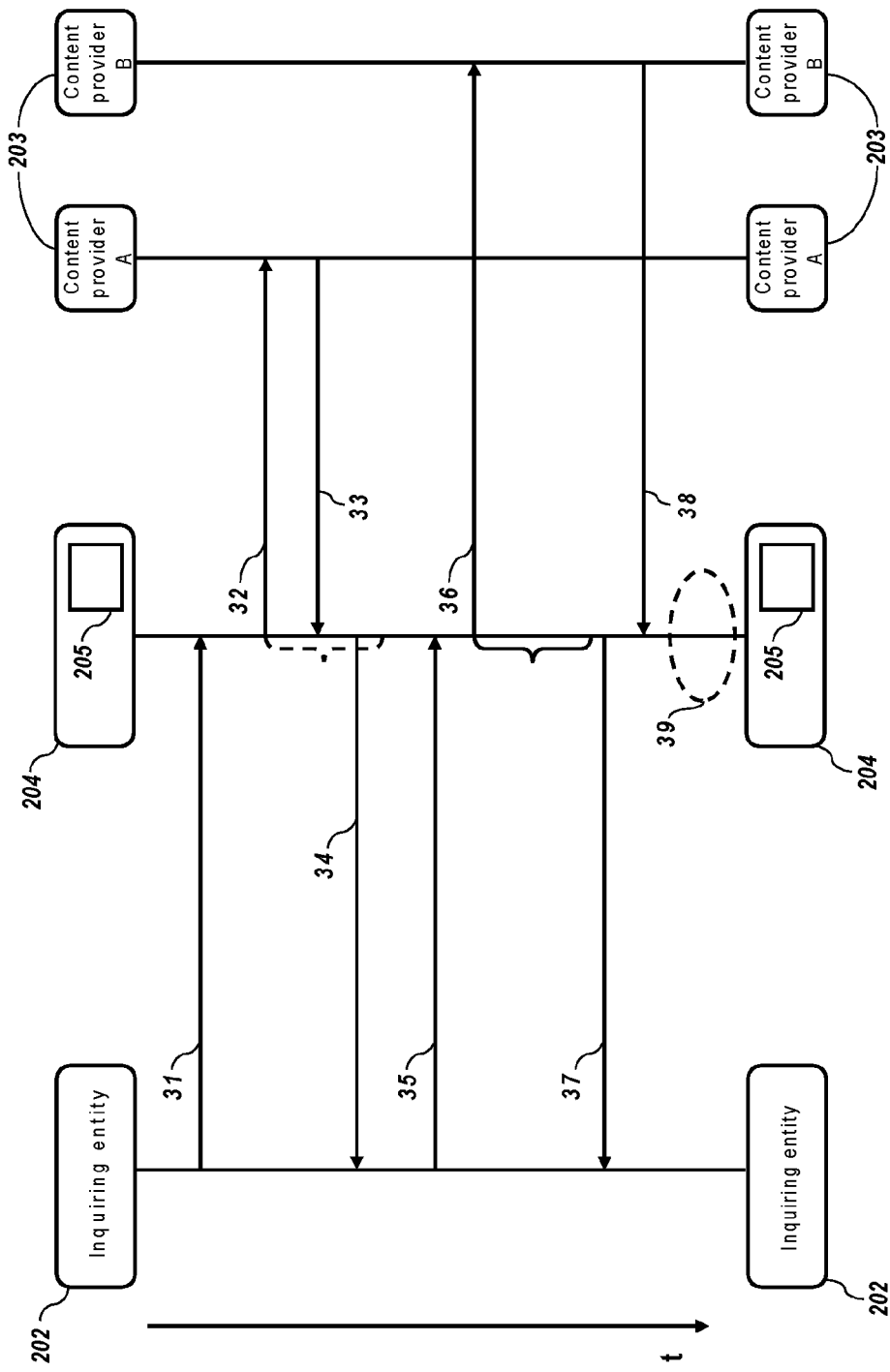
FIG. 3 shows a message flow illustrating the operation of the query processing server.
Figure 4:
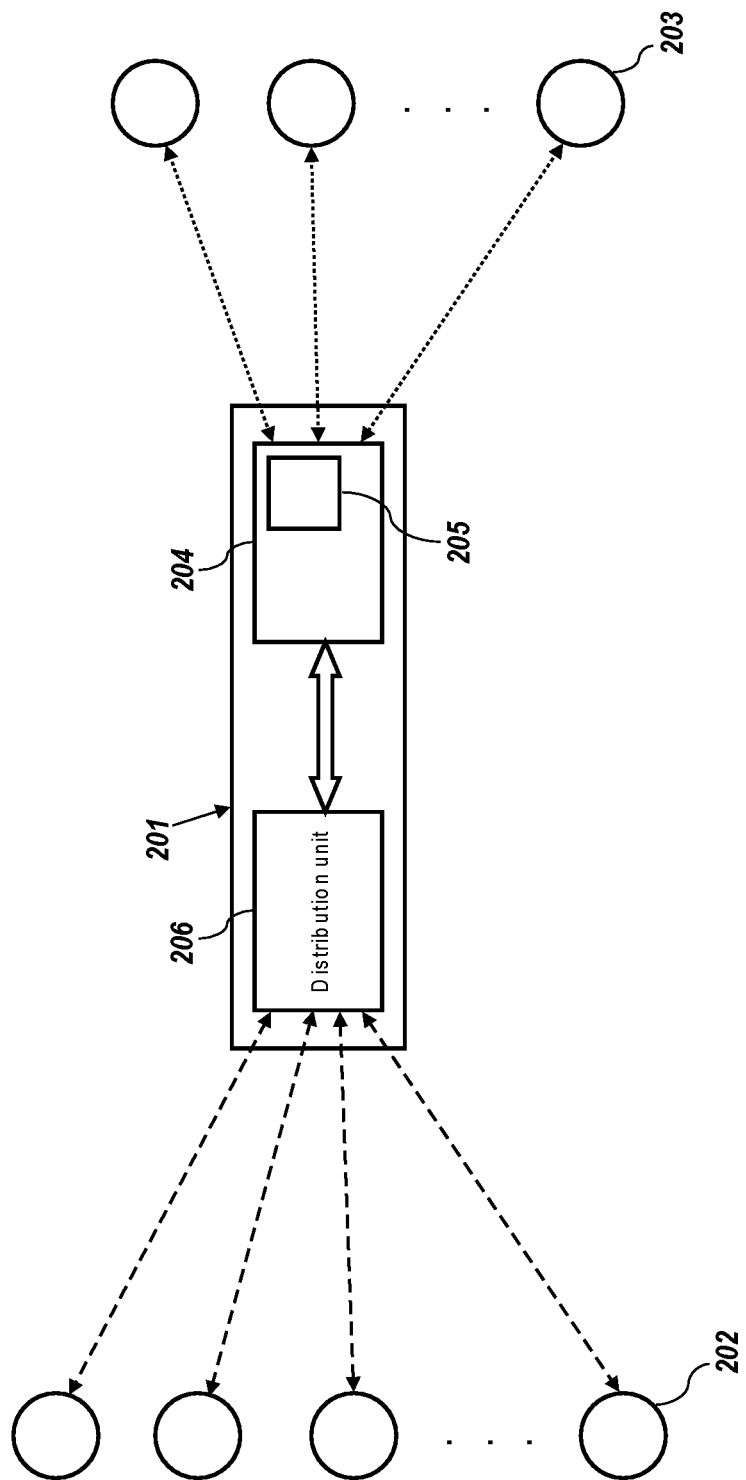
FIG. 4 schematically shows a distributed information processing system featuring a query processing server.
Figure 5:
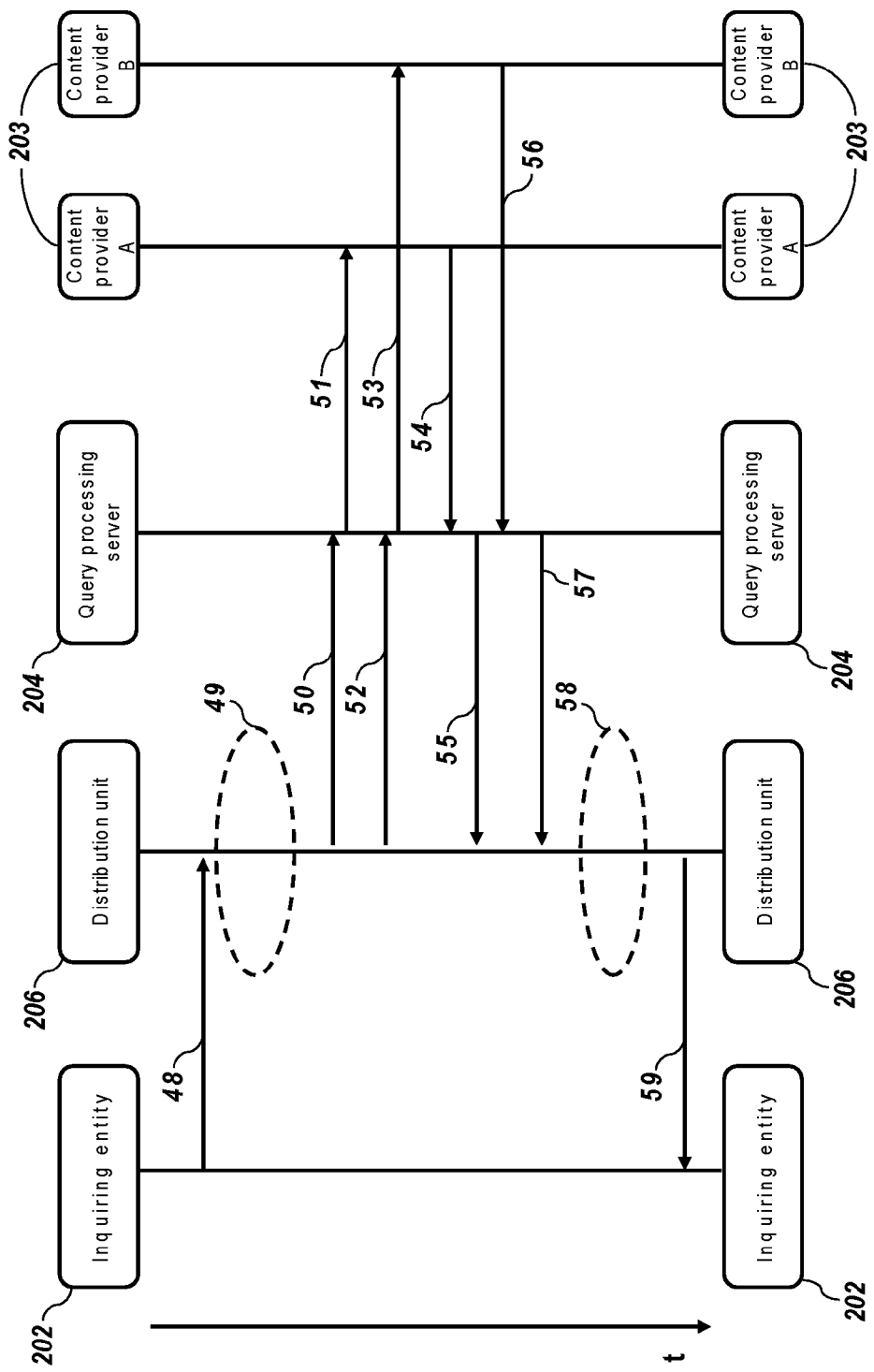
FIG. 5 illustrates an exemplary message flow within the system of FIG. 4.

With reference to FIGS. 3 to 5, a distributed information processing system 201, such as found in a search machine environment, is configured to deal with the deficiencies of conventional distributed information processing systems and may provide predictable and selectable timing requirement for inquiring entities for responses to their requests. The predictable and selectable timing requirement may achieved by the provision of a query processing server including a particular utilization of a cache, as described in detail hereinbelow.

Caches may introduce a certain amount of incorrectness or inaccuracy because their content does not necessarily correspond to the actual content of the content provider platforms. Hence, in addition to time requirements regarding the responses to the inquiring entities, accuracy requirements that may be desired by inquiring entities may be addressed.

The provision of predictable timing conditions for responses to queries caused by inquiring entities may be achieved by a query processing server 204 of the distributed information processing system 201. The query processing server 204 is arranged to accept information queries originating from the inquiring entities 202 and to transmit them to the respective content provider platform 203. The information queries processed by the query processing server 204 may be queries of all sorts such as search queries or database queries. In the following, the term information query is meant to be a request for information which is processed by the query processing server 204 and directed to a single content provider platform 203. More complex requests for information which potentially (but not necessarily) require responses from more than one content provider platform are referred to as information requests hereinafter.

In order to ensure a predictable response in terms of time (and optionally, as explained further below, also in terms of accuracy) to the inquiring entity 202, the query processing server 204 maintains a cache 205. The cache 205 is used as a source for an auxiliary response to the inquiring entity 202 in the case the content provider platform 203 does not respond in due course. The cache 205 includes query response data that the query processing server 204 e.g., received previously from the content provider platforms 203 in response to earlier information queries. The cache 205 may be implemented by means of a database such as a relational database using a relational database management system (RDBMS). For example, for each particular information query that was previously processed by the query processing server 204, a particular data structure such as a data record may be present in the cache 205. For example, each data record stores the respective query response data included in the latest response to the particular information query received from the content provider platform 203.

In order to provide reliable timing conditions, the query processing server 204 operates as follows.

In the course of relaying an information query to a content provider platform 203, the query processing server 204 sets and monitors a time limit for the response to this particular information query. For example, the query processing server 204 initiates a timer when forwarding the query to the content provider platform 203. The duration of the time limit e.g., depends on the inquiring entity 202 which is responsible for the particular information query and which awaits the answer to it. Thus, the time limit may vary from inquiring entity to inquiring entity.

The further operation of the query processing server 204 depends on whether or not the content provider platform 203 responds within the monitored time limit. If the content provider platform 203 responds within the time limit, the query processing server 204 forwards the response further to the inquiring entity 202. Additionally, the query processing server 204 updates the cache 205 in view of the received and forwarded response. The timer tracking the time limit is stopped.

If, however, the content provider platform 203 is slower than the time limit, i.e., the query processing server 204 does not receive a response from the content provider platform 203 within the given time limit, it utilizes the cache 205 to generate a response replacing the provider response failing to appear. Hence, when the time limit is over, e.g., when the timer has elapsed, the query processing server 204 looks up the cache 205 for query response data corresponding to the particular information query and, in the case the cache 205 includes query response data for that particular information query (and, optionally, the available query response data is accurate enough, as will be explained further below), generates and forwards a response to the inquiring entity 202 on the basis of the cache 205. Such response generated by utilizing query response data in the cache 205 is referred to as a cached-based response hereinafter.

It is possible that the query processing server 204 still receives a response from the content provider platform 203 at a later point of time, after the time limit has already exceeded and a cache-based response has already been generated and relayed to the inquiring entity 202. In this situation, the late-arrived response from the content provider platform 203 is still useful. It is used by the query processing server 204 to update the cache 205.

This general operation of the query processing server 204 may be visualized by the example of FIG. 3.

First, an information query 31 arrives at query processing server 204 and is forwarded to content provider platform A with message 32. Query processing server 204 keeps track of the time limit required by the inquiring entity 202 (indicated by the dashed curly bracket). The response 33 by content provider platform A is received within the time limit (still within the dashed curly bracket). Hence, the query processing server 204 forwards this response further to the inquiring entity 202 with message 34 and updates the cache with the response received from content provider platform A.

Another information query 35 arrives at query processing server 204. Again, it is forwarded to the respective content provider platform 203, this time to content provider platform B, with message 36. The time limit is monitored accordingly (indicated by the continuous curly bracket). However, content provider B fails to respond within the time requirements of inquiring entity 202; the query processing server 204 does not receive a response within the time limit (no response within the time indicated by the continuous curly bracket). At this point, query processing server 204 utilizes the cache 205 and generates a cache-based response 37 instead of the missing response from the content provider platform B. The cache-based response 37 is forwarded to the inquiring entity 202 thereby ensuring its response time limit requirements. Afterwards, the query processing server 204 still receives the outstanding response 38 from content provider platform B. This response cannot be utilized for responding to the inquiring entity 202 as this response has already been sent as the cache-based response 37. Rather, response 38 is used to update the cache 205 (indicated by dashed oval 39).

Thus, the present system 201 and query processing server 204 operates generally different than the known cache-based systems in which a cache is utilized as the primary source of response data in order to minimize the response time. The cache is filled beforehand and responses to inquiries are generally taken from the cache. Only as an auxiliary measure, e.g., in the case the cache does not have the necessary information of the cached information is out of date, the original source of information is queried. This is in contrast to the approach presented herein according to which the content provider platforms 203 as original sources of information are used as the primary source, i.e., the query processing server 204 directs each information query to the respective content provider platform 203. The cache 205 is used only as an auxiliary pool of information in the case the content provider platform 203 does not respond in due time, i.e., a response from the content provider platform 203 is still outstanding when the time limit elapses.

The query processing server 204 may be a separate hardware and/or software platform such as a personal computer or a server rack-mounted in a computer rack. Depending on the load to be handled by the query processing server 204 and the performance needed, it may also be formed by a plurality of hosts such as a local area network including several interconnected computer hosts or a server farm. Alternatively, the query processing server 204 may be integrated with other functional components of the distributed information processing system 201, such as the optional distribution unit 206.

The inquiring entities 202 may be any computer hosts or information terminals of any kind, for example personal computers, mobile stations equipped with IEEE 802.11 and/or 2G/3G/4G interfaces, tablet PCs, laptops, either used in private or business environments, or public information terminals such as ticket machines, check-in machines, cash machines etc.

Content provider platforms 203 may be computer systems offering information services such as databases, web-hosts in the Internet or within an intranet, B2B platforms and other servers of all kinds. Generally, each computing platform 203 includes a hardware architecture with a processor and a memory, and a software framework (including application frameworks such as Java). The hardware/software combination allows software to run on the platform. Typical platforms include a computer architecture, an operating system, and Runtime libraries.

Optionally, information processing system 201 includes a distribution unit 206 which is—logically and in terms of information flow—located between the inquiring entities 202 and the query processing server 204. The distribution unit 206 enables the inquiring entities 202 to transmit information requests (as opposed to information queries), i.e., potentially more complex requests possibly requiring responses from more than one content provider platform 203. An information request requiring responses from only a single content provider platform 203 is referred to as a single-provider request. An information request requiring responses from more than one content provider platform 203 is referred to as a multi-provider request. An information request from an inquiring entity 202 is received by the distribution unit 206 which analyzes and converts the information request into an information query (if it is a single-provider request) or, in the case of a multi-provider request, decomposes the information request into a plurality of information queries. The conversion or decomposition may include a determination of the correct content provider platform 203 to which the resulting information query is to be directed. In this option, an identifier of the respective content provider platform 203 is included in each information query so that the query processing server 204 is able to route the information queries on the basis of this identifier to the correct content provider platform 203.

On the other hand, the distribution unit 206 receives the responses to the information queries from the query processing server 204, namely both, the responses received from the content provider platforms 203 as well as the cache-based responses generated by the query processing server 204 in the event of absent responses from the content provider platforms 203. The distribution unit 206 analyzes the responses to the information queries. A response relating to a single-provider request is converted back by the distribution unit 206 to an information request response and/or forwarded to the inquiring entity from which the information request came. Responses relating to a multi-provider request either are re-assembled to an integrated answer to the information request or, alternatively, forwarded as separate responses back to the inquiring entity 202. The re-assembling is particularly supported by the present system and the operation of the query processing server 204 because the query processing server 204, in most cases, provides for standardized response times. Hence, the distribution unit 206 generally receives (provider or cache-based) responses relating to a particular multi-provider request within a predictable amount of time, depending on the time limit employed by the query processing server 204. Hence, the distribution unit 206 is easily able to re-compose the responses relating to a multi-provider request as they all arrive at a well-defined period of time.

In an embodiment, the distributed information processing system 201 may comprise a reservation systems operating as a multi-provider aggregator in a travel search environment. The information processing system 201 may be a central reservation system (CRS) or a global distribution system (GDS) that also provides the ability to store and retrieve information related to air travel, hotels, rail, and other activities, and to conduct transactions (e.g., bookings) for air travel, hotels, rail, or other activities. For example, the reservation system may include the capability of car rental processing and multiple rental car agencies may supply the content provider platforms 203. The service provider embodied in the information processing system 201 may offer unified storage and retrieval of information relating to travel option availability, such as information relating to car rental availability, and the ability to book car rentals to its customers serving as the inquiring entities 202.

The content provider platforms 203 may correspond to servers that may be operated by or operated under the control of travel content providers, such as rental car agencies or companies like Hertz, Avis, Europcar, Alamo, Enterprise, Sixt, etc. The inquiring entities 202 may be customers of these rental car companies, such as private or business users (e.g., airlines, hotels, or any sort of company) or travel agencies, or web servers/websites (e.g., presenting advertisements of rental car providers on their websites), with computer systems configured to place inquiries for rental car bookings to which the rental car companies can respond with availability and other information (e.g., rental rates). For example, the multi-provider shopping requests received from the inquiring entities 202 may comprise shopping requests for rental cars and the travel reservation system may communicate a single provider shopping request to two or more of the various different rental car companies constituting the content provider platforms 203. Each shopping request may inquire about rate or price, availability, etc. Alternatively, the inquiring entity 202 may make shopping requests for other purposes, such as displaying rental car advertisements at its website with an indication of rate or price. Such rental car advertisements may serve as enticements or teasers to attract a potential booking for the inquiring entity 202 offering the rental cars to the public, the host for the distributed information processing system 201, and a rental car company.

FIG. 4 provides an overview of the resulting system 201 including the query processing server 204 and the optional distribution unit 206 connecting the inquiring entities 202 with the content provider platforms 203. Any number of inquiring entities 202 may be present. In particular systems 201, only one inquiring entity 202 may exist, while other systems 201 include a plurality of inquiring entities 202 up to a greater number such as a couple of tens, hundreds or even thousands or more. The same applies to the number of content provider platforms 203. The system 201 includes at least two content provider platforms 203 because it is the function of the distribution unit 206 and the query processing server 204 to provide a uniform service of the plurality of content provider platforms 203 to the inquiring entities 202. However, the number of content provider platforms 203 may be greater than two. Some system will include a relatively small number of content provider platforms 203 such as three, four or five. Other systems include a substantially greater number of content provider platforms 203, e.g., several tens, hundreds, thousands or even more.

FIG. 5 visualizes a multi-provider information request that is processed by the distribution unit 206. The distribution unit 206 receives a multi-provider information request 48 from inquiring entity 202. For example, the information request may comprise a pricing search request for a rental car based upon an airport or city, a specific address or landmark, car rental station, etc., a pick-up date, and a drop-off date. The distribution unit 206 analyzes the request and splits it up (indicated by dashed oval 49) into a plurality of information queries 50, 52. The information queries 50, 52 are forwarded to the query processing server 204, which further relays them to the correct content provider platforms 203. For example, the rental car information queries 50, 52 may be forwarded to two or more different rental car providers embodying content provider platforms 203. In the representative embodiment, information query 50 is relayed to content provider platform A as data in a message 51 and information query 52 is directed to content provider platform B as data in a message 53.

In response to the information query 50, the query processing server 204 receives the response 54 from content provider platform A and, after updating the cache 205, may forward the response 54 to the distribution unit 206 with as data in a message 55. Alternatively, the response 54 may comprise a cache-based response. In response to the information query 50, the query processing server 204 receives response 56 from content provider platform 203 and similarly may forward the response 56 to distribution unit 206 as data in a message 57. Alternatively, the response 56 may comprise a cache-based response. Each of the responses 54, 56 may include rental car availability and rates. The distribution unit 206 now has the responses 54, 56 to the information queries 50, 52 available. It re-composes them and forms a unitary response to the inquiring entity's information request 48 (indicated by dashed oval 58). The unitary response is then returned to the inquiring entity 202 as data in a message 59.

The query processing server 204 may maintain an accuracy metric for each query response data held in the cache 205. The accuracy metric gives an indication of the probability that the cached response data corresponds to the response that would have been received from the content provider platform 203. The accuracy metric may be stored in the same database as the cached query response data.

The query processing server 204 may only generate and forward a cache-based response if the cached query response data fulfils a given accuracy requirement. For example, after a time-out for a response from the content provider platform 203, the query processing server 204 looks up the response data stored in the cache 205 relating to the information query in question and determines the corresponding accuracy metric for that cached query response data. If the value of the accuracy metric is at or above a given threshold value, a cache-based response is generated and relayed to the distribution unit 206 and/or inquiring entity 202. By this, a certain level of accuracy is ensured.

If, however, the value of the query response data does not meet the given accuracy threshold, a cache-based response is not generated. In this case, the query processing server 204 optionally generates an error message indicating to the distribution unit 206 and/or inquiring entity 202 that it was unable to retrieve a response to the information query within the desired time and accuracy constraints.

The accuracy threshold may be set according to accuracy requirements of the inquiring entity that was responsible for a particular information query. Thus, the information processing environment 201 allows the inquiring entities 202 to pre-set their respective accuracy requirements, e.g., a particular accuracy threshold which is considered by the query processing server 204 when trying to generate a cache-based response. There are several possibilities to implement such pre-setting of the accuracy threshold.

Each inquiring entity 202 may include its accuracy setting into its information requests/information queries. The distribution unit 206 includes the settings into the information queries when converting/decomposing the information requests and/or the query processing server 204 reads out these settings from the information queries it receives and acts accordingly (i.e., generates a cache-based response only if the accuracy threshold is met). This solution is flexible as it allows the inquiring entities 202 to dynamically vary their accuracy requirements from information request to information request.

Alternatively, the accuracy requirements of each inquiring entity 202 may be stored in the system, e.g., in the database of the query processing server 204 or in an external database accessible by the query processing server 204, and the information requests/information queries only contain an identification of the originating inquiring entity 202. The query processing server 204 looks up the accuracy requirements of the inquiring entity 202 in the database and acts accordingly when trying to generate a cache-based response. This solution is more static (although the inquiring entities 202 can be provided with an interface to automatically change their accuracy settings held within the system), but eliminates the requirement to include the accuracy values in the information requests/information queries.

A mixture of both options is possible as well. For example, the query processing server 204 has access to permanently stored accuracy thresholds of the inquiring entities 202, but the inquiring entities 202 nevertheless can choose to include accuracy threshold values in their information requests/information queries that overwrite the values kept in the system for that particular information request/information query. Hence, if such overwriting functionality is implemented by the query processing server 204, it will use the accuracy threshold included in the information request/information query for processing this particular information request/information query as opposed to the accuracy values maintained in the database.

The accuracy metrics of the cached query response data may define the accuracy of each query response data set stored in the cache 205 over time. According to one alternative, this is realized by defining time intervals and providing an accuracy value for each time interval. Hence, for each query response data, the accuracy metric is built by a set of tuples of time interval $t_x$ and associated accuracy value $a_x$. For example, if four time intervals are defined, a structure like $\{t_0: a_0, t_1: a_1, t_2: a_2, t_3: a_3\}$ results, for each information query' query response data stored in the cache 205. This accuracy structure is, for example, implemented by data records which are, for example, held in the database of the query processing server 204.

The time-interval-related accuracy metric may be based on time intervals that are relative time intervals defining time periods in the past prior to the time at which a particular information query is received by the query processing server 204. Relative time intervals means that the time intervals do not relate to absolute points of time (such as 1 to 2 p.m., 2 to 3 p.m. etc.), but to the point of time at which query processing server 204 receives the information query (i.e., such as last 5 minutes, 5 to 10 minutes in the past and so on). Examples will subsequently be described with reference to FIGS. 7 and 8.

Such relative time intervals effectively give an indication about the volatility of query responses or, more generally, content provider platform data. Relative time intervals are utilized as follows by the query processing server 204. When the query processing server 204 receives a particular information query, it checks in which relative time interval this information query falls. This check is performed by determining the time lapsed since the last change of the query response data stored in the cache 205 for that particular information query, i.e., by comparing the (absolute) time at which the current response data to that information query was stored in the cache 205 and the (absolute) time of the information query reception. For example, if the cached response data for that information query was most recently changed six minutes ago, the current information query falls into an (exemplary) time interval "5 to 10 minutes". The accuracy value for this time interval indicates how reliable the currently cached response data is. If the respective data of the content provider platform 203 only changes, for example, once an hour on average, there is a good chance that the current cached response data stored six minutes ago is still accurate (i.e., corresponds to the data in the content provider platform 203) and the accuracy value will be rather high. If, however, the data of the content provider platform 203 changes more often, e.g., every minute, the cached response data stored six minutes ago will probably be outdated and the respective accuracy value for the 5 to 10 minutes time interval will be rather low.

As already outlined above, the generation of a cache-based query response by the query processing server 204 in the case of a time limit excess may include a determination whether or not the accuracy metric of the cached response data meets the given accuracy threshold. If the accuracy metric is based on relative time intervals as described before, this determination includes the determination of the relevant time interval (time elapsed since the last change of response data or, in other words, the last cache update for the cached response data), the determination of the respective accuracy value for that time interval and a comparison of the time interval's accuracy value with the accuracy threshold of the inquiring entity 202.

The accuracy value for each time intervals (be they absolute time intervals or, as described before, relative time intervals) may be composed of a plurality of single values: an accuracy parameter and a confidence factor. The accuracy parameter is the actual indicator of the accuracy of the time interval. It is, for example, specified as a percentage value. For example, an accuracy value of 99% referring to a 0 to 5 minutes relative time interval indicates that the cached response data for the particular information query correctly reflects the respective data of the content provider platform 203 in 99 of 100 cases within the first five minutes after a cache update. The confidence factor gives an indication of how reliable the accuracy value for the time interval is. For example, the confidence factor indicates how many cache updates have been previously conducted in that time interval. For example, a confidence factor of 200 for the aforementioned accuracy value (99% in the 0 to 5 minutes time interval) indicates that 200 samples have been taken in that time interval meaning that 200 responses have been received from the content provider platform 203 within five minutes after the cached response data has been changed (the accuracy value of 99% then means that from these 200 received responses within the five-minute interval, only four responses did not correspond to the cached response data and the cache had to be updated in that regard).

As outlined above, the query processing server 204 generates and forwards an error message if the cached-based response does not fulfill the accuracy requirements of the inquiring entity 202. If accuracy metrics including the accuracy parameter and confidence factor, the inquiring entity's accuracy requirements stipulate a threshold for each value. Thus, the accuracy requirements are considered to be met if these values are each at or above the thresholds given by the inquiring entity (as outlined above, either being included in the information request/information query and/or held in a database accessible by the query processing server 204). Hence, a cache-based response is only generated and forwarded by the query processing server 204 if the accuracy value (for the specific time interval, if applicable) and the confidence factor (for the specific time interval, if applicable) are sufficient. Otherwise, if either the accuracy value or the confidence factor (and, all the more, if both) is below the given threshold value, the query processing server 204 generates an error message and forwards it to the distribution unit 206 and the inquiring entity 202, respectively.

In all the various optional implementations involving an accuracy metric (be it on the basis of absolute or relative time intervals and/or using accuracy parameters and confidence factors or another implementation), the query processing server's cache updating activity does not only involve checking and potentially updating the cached query response data, but also updating the cached query response data's accuracy metric. Thus, for every query response received from a content provider platform 203, the query processing server checks whether the cached query response data still equals the data in the received response and updates the accuracy metric (e.g., the accuracy parameter) accordingly. If the accuracy metric is based on time intervals, the accuracy metric data relating to the particular time interval of the information query is updated.

As outlined above, the duration of the time limit which determines when the query processing server generates a cache-based response may depend on the inquiring entity 202 which is responsible for the particular information query. Similar to the accuracy metric, the inquiring entities 202 optionally include their respective time limit in their information requests/information queries. The query processing server 204 reads out this information from the information query and initiates the time limit timer accordingly. Alternatively or additionally, the inquiring entities time limits are deposited in a database accessible by the query processing server 204 and the information requests/information queries include an identification of the inquiring entity 202.

In an alternative embodiment, updating of the query response information in the cache 205 when receiving a query response from the content provider platform 203 may include two kinds of activities.

On the one hand, the cached query response data itself may need to be updated. This is the case if either the cache 205 has not yet included the query response data for the particular information query at all or the cached query response data is outdated, i.e., the response from the content provider platform 203 has delivered different response data than kept in the cache 205 so far. In the former case, the query response data is added to the cache 205 for the first time. In the latter case, the cached query response data is changed in accordance with the response received from the content provider platform 203.

If neither situation (no query response data in the cache 205 or cached query response data is outdated) is present after a query response is received from the content provider platform 203, i.e., the query response data stored in the cache 205 corresponds to the data contained in the response from the content provider platform 203, updating the information query response data in the cache is just checking whether or not an addition or amendment of the cache 205 is necessary.

On the other hand, the query processing server 204 also stores the point of time when it received the query response data from the content provider platform 203, at least when query response data is added to or amended in the cache 205. Storing the time of the response reception is at least done in implementations using relative time intervals because—as explained above—managing the accuracy metrics and the determination whether or not a cache-based response fulfils the inquiring entity's accuracy requirements includes a determination of the elapsed time since the response data has been stored in the cache 205.

Now turning to FIGS. 6 to 12, FIG. 6 shows an exemplary processing flow of activities performed by the query processing server 204 when processing information queries and responses from the content provider platforms 203.

The query processing server 204 receives an information query at 60, either from one of the inquiring entities 202 or via the distribution unit 206. The information query 60 may be shopping request for rental car. The query processing server 204 processes the information query at 61. In particular, the query processing server 204 initiates a timer for receiving a response to it in accordance with time limit requirements (i.e., time limit) of the inquiring entity 202. The query processing server 204 routes the information query to the respective content provider platform 203 at 62. Then, the query processing server 204 waits for a response to the information query from the content provider platform 203 during 63.

Figure 6:
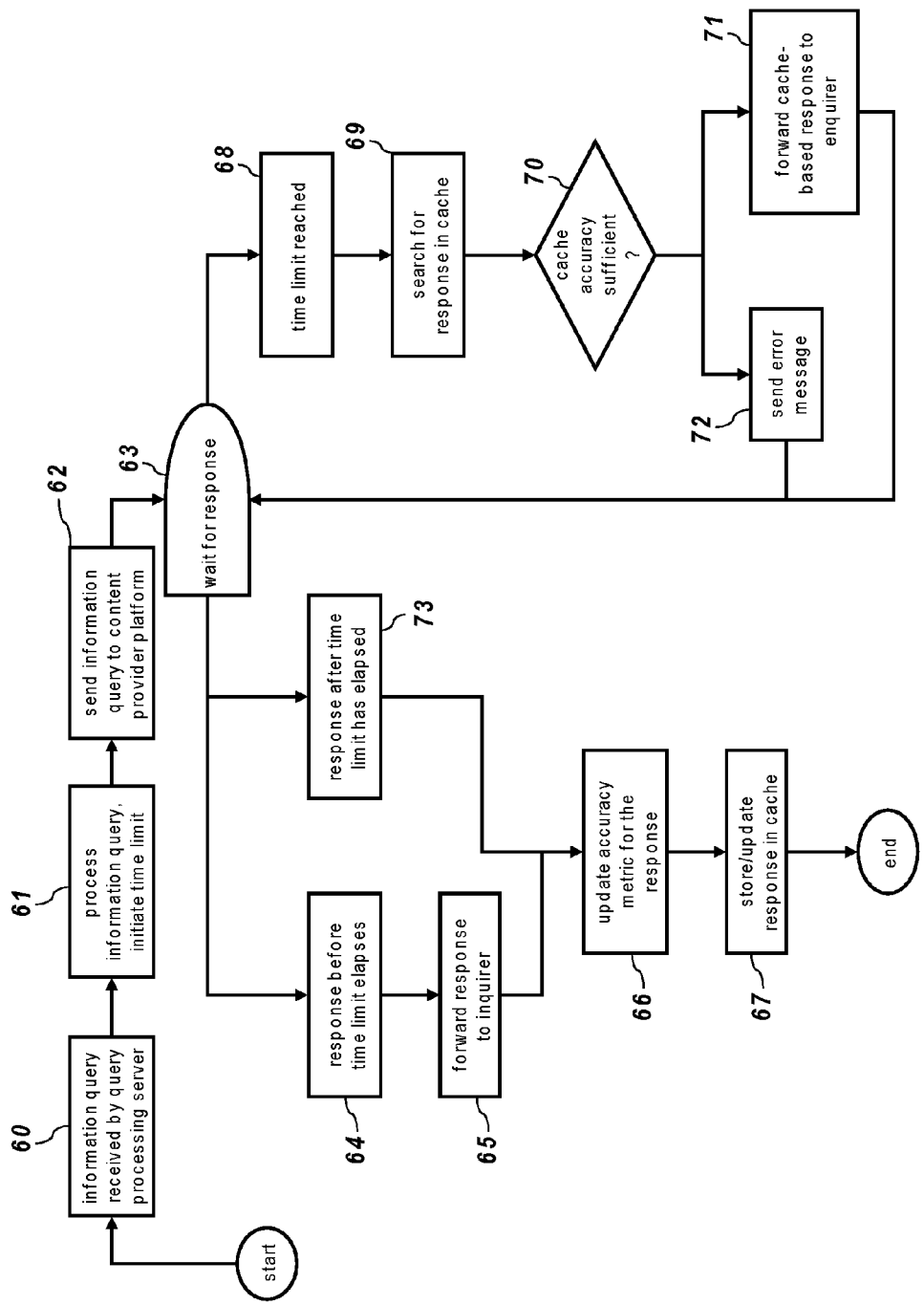
FIG. 6 is a flow diagram regarding the operation of a query processing server.

The next activities of query processing server 204 are triggered by one of the following three events: the response from the content provider platform 203 is received before the time limit elapses (left branch in FIG. 6), the time limit is reached (right branch in FIG. 6), the query processing server 204 receives the response from the content provider platform 203 only after the time limit has elapsed (middle branch in FIG. 6).

If the content provider platform's response arrives within the time limit at 64, the query processing server 204 forwards the response further to the inquiring entity 202 at 65, possibly via distribution unit 206. In addition, it locally processes the response by stopping the timer, updating the response's accuracy metric for the cache 205 at 66 and, if the cache 205 does not at all contain response data for the response or only outdated response data, stores and updates the response data reflecting the query response received from the content provider platform 203 in the cache 205 at 67. In an alternative implementation, the order of activities 65, 66 and 67 is different than indicated by FIG. 6. For example, the response is first processed locally by performing activities 66 and 67 and the response is only forwarded afterwards at 65.

If the response from the content provider platform 203 does not arrive at query processing server 204 within the time limit, the timer elapses at some point of time at 68. It is then the duty of query processing server to try to generate a cache-based response in order to cope with the time limit requirements of the inquiring entity 202. Hence, the query processing server 204 searches for response data relating to the information query in the cache 205 at 69. If such response data cannot be found, e.g., because the cache 205 does not yet contain such response data (which could happen e.g., if that particular information query has not been received and processed by the query processing server 204 or if the content provider platform 203 has never responded to that particular information query in time before), an error message is generated and forwarded to the inquiring entity 202, possibly via distribution unit 206. If, however, the cache 205 contains response data relating to the particular information query, the accuracy requirements of the inquiring entity 202 are checked at 70. If the cached response data fulfils the given accuracy requirements, e.g., the accuracy threshold set by the inquiring entity 202 is met by the accuracy parameter and confidence level of the cached response data, the query processing server 204 generates a cache-based response including the cached response data and forwards the cache-based response to the inquiring entity 202, possibly via distribution unit 206, at 71. Otherwise, i.e., if the accuracy requirements are not met by the cached response data, e.g., its accuracy parameter and/or confidence level are below the threshold given by the inquiring entity 202, the query processing server 204 generates and forwards an error message at 72.

If the response from the content provider platform 203 to the information query arrives at the query processing server 204 after the time limit has elapsed at 73, the response is not forwarded to the inquiring entity 202 because either this has already been done by forwarding a cache-based response at 71 or, if a cache-based response could not been generated, an error message has been forwarded at 72. Rather, the response from the content provider platform 203 is processed locally in order to update the cache 205. To this end, the corresponding response data's accuracy metric and the response data itself are updated at 66 and 67, respectively, as already explained above.

Being equipped with this functionality, the query processing server 204 is able to guarantee the needs of the inquiring entity 202 in term of response time and accuracy. If a content provider platform 203 is faster than the inquiring entity's time limit, the response provided by the content provider platform 203 is sent back to the inquiring entity 202. This response is of 100% accuracy as it in any case reflects the data current held by the content provider platform 203. It is also returned within the time limit. Thus, both, time and accuracy requirements are met. If, however, the content provider platform 203 is too slow and does not respond within the time limit, the query processing server 204 provides a cache-based response matching the inquiring entity's accuracy level and within the time limit defined by the inquiring entity 202. The content provider platform's response arriving at a later point of time is used to update the cache 205 and the accuracy metrics relating to the response. Thus, the query processing server's operation returns the most current response data within the given time limit. This is particularly advantageous for multi-provider information requests that can be answered by a mixture of cache-based responses (for respective content-provider platforms 203 that respond only after the time limit elapses) and current responses from the content provider platforms 203 (for respective content-provider platforms 203 that respond within the time limit).

Figure 7:
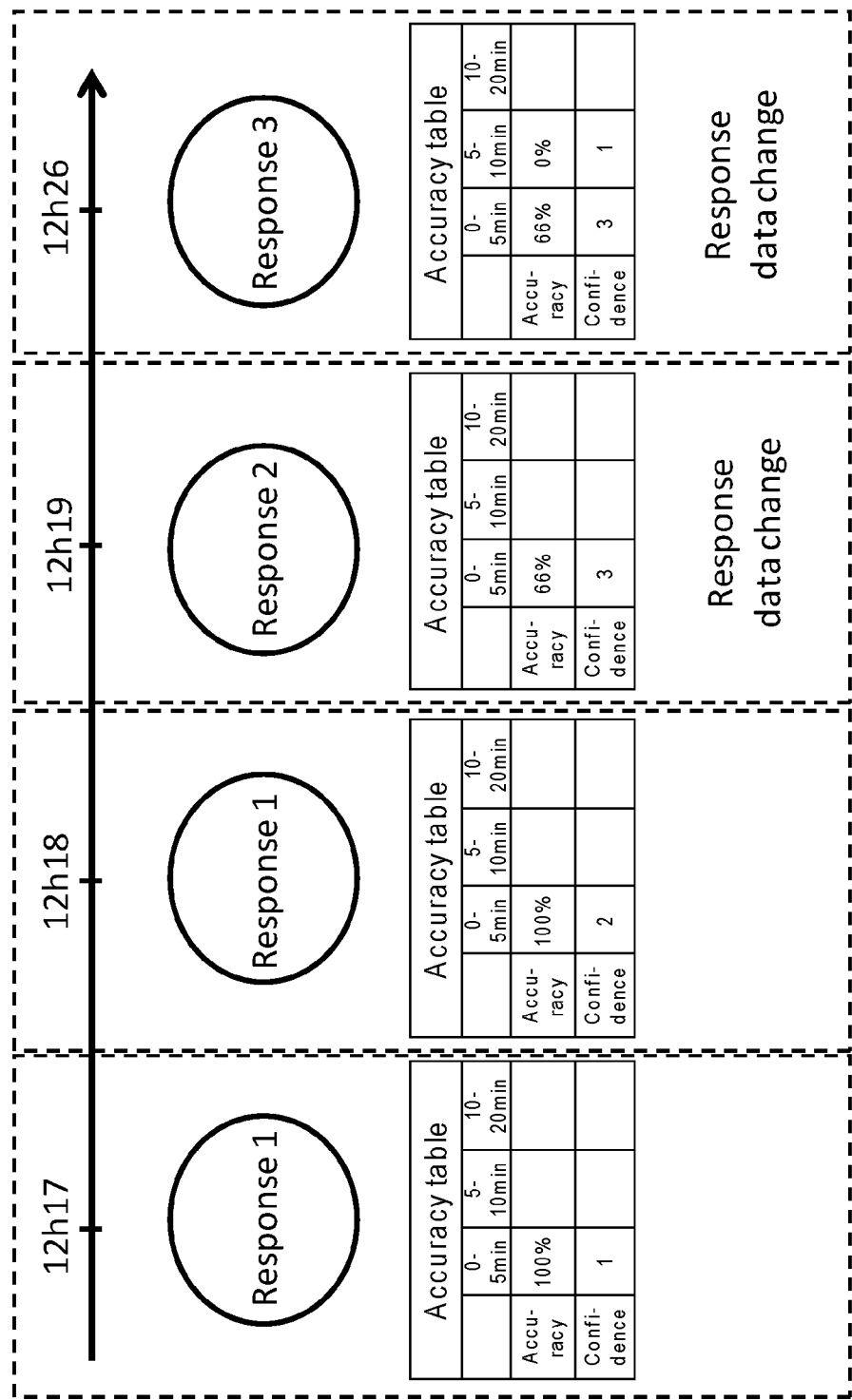
FIG. 7 depicts an exemplary sequence of a particular information query, its storing in a cache and updating the corresponding accuracy metric data.

An example of an accuracy metrics is given with reference of FIG. 7 which relates to one particular information query and respective responses received by the query processing server 204 from the content provider platform 203. As explained in detail above, the query processing server stores response data reflecting the responses received from the content provider platform 203 in the cache 205. In the exemplary implementation shown by FIG. 7, the cache 205 also includes an accuracy table for each response data relating to one information query. FIG. 7 shows the build-up of the accuracy table for the response data regarding to an exemplary information response.

On the one hand, the columns of the exemplary accuracy table of FIG. 7 define three relative time intervals which relate to the time passed since the reception of the response to the information query from the content provider platform 203. The first time interval ("0-5 min") relates to the last five minutes prior to the arrival of the response, the second one ("5-10 min") to the five minutes before the first time interval and the third one ("10-20 min") to a time period of ten minutes prior to the second time interval. Hence, the accuracy metric according to FIG. 7 covers twenty minutes in the past of every response received from the content provider platform 203.

On the other hand, the accuracy metrics according to FIG. 7 are composed of two single factors for each of which a line of the accuracy table is reserved: an accuracy value and a confidence factor. The accuracy value is an accumulated percentage of responses received within the respective time interval being equal to the cached response data. Hence, it is a probability that the response stored in the cache 205 is valid over a period of time since this response was stored in the cache 205 or received from the content provider platform 203 for the last time. The confidence factor states how many responses have been actually received from the content provider platform 203 within each time interval and, thus, gives a confidence indication on the accuracy value it is associated with.

The mechanism of these accuracy metrics becomes apparent by the flow of four responses shown by FIG. 7. The time stamps indicated by the time bar on top of FIG. 7 indicate the points of time at which the query processing server receives the responses from the content provider platform 203. Prior to each of these responses arriving from the content provider platform 203, the query processing server 204 received the (same) information query, processed (which included the initiation of a timer) and forwarded it to the content provider platform 203.

At 12:17, the query processing server receives the first response to the information query. The accuracy table has still been empty beforehand; the first entry is now made. Since this is the first response which is stored in the cache, it belongs to the "0-5 min" time interval, the accuracy parameter is initialized at 100% and the number of received responses (i.e., the confidence factor) is initialized to 1. In addition, the query processing server 204 also stores the time stamp 12:17 of the received response.

A further response is then received already one minute later, at 12:18. The relevant time period is determined by calculating the difference between the time stamp of the last response (12:17) and the time stamp of the current response (12:18). As one minute has been passed since the last response, the accuracy values for the "0-5 min" time period are to be updated. In order to do this, the response received from the content provider platform 203 is compared with the response data kept in the cache. They are still both identical (shown by "Response 1" in FIG. 7 which indicates that the second response is equal to the first response). Thus, the accuracy parameter remains at 100%. The confidence factor is incremented to 2 as now two responses have been received in the time period of "0-5 min". The time stamp of the last response is updated as well, from 12:17 to 12:18.

Another minute later, at 12:19, the query processing server 204 receives the next response from the content provider platform 203. Again, it is a response falling into the first time period "0-5 min", as only one minute has passed since the last response came in. Hence, again, the numbers of first time period are to be updated. However, this time, the response data has changed which is indicated by "Response 2" and the note "Response data change" meaning that this response has returned different response data than the first two responses referred to as "Response 1". Therefore, the accuracy parameter of the first time period is updated to 66% because one of the three responses received differed from the response data stored in the cache 205. The confidence factor concerning the first time period is incremented to 3 as three responses relating to the "0-5 min" time period have now been received by the query processing server 204. In addition, the time stamp of the last response received from the content provider platform 203 is updated from 12:18 to 12:19. Of course, the query processing server 204 also updates the response data kept in the cache 205 to the data carried by "Response 2".

Finally, the query processing server 204 receives a further response at 12:26. It calculates the time differences to the last response received at 12:19 (equals to seven minutes) and consequently determines the second time interval "5-10 min" as to be updated. The response received is labelled "Response 3" indicating that the response data has changed once again with respect to the previous "Response 2". Therefore, the accuracy parameter of the second time period "5-10 min" is initialized to only 0% because zero responses in this time period have been received conforming with the response data stored in the cache 205. The confidence factor of the second time period "5-10 min" is initialized to 1 as this is the first response received in this time period. Again, the time-stamp of the last response received is updated from 12:19 to 12:26 and the response data stored in the cache 205 is updated reflecting the "Response 3".

Thus, the query processing server uses use the complete production traffic to compute and update the accuracy level per information query. The granularity of the accuracy, in particular the time periods, are implementation-specific and, for example, depend on the requirements of the inquiring entities and/or the data volatility of the content provider platforms 203. For example, if the data of a particular content provider platform 203 is generally stable over a period of two to three weeks, it would be sensible to define the time periods significantly longer than shown by the example of FIG. 7, e.g., two weeks as the first time period, another week as the second time period and another two weeks as the third time period. Of course, the accuracy table may also define more than three time periods. The accuracy level for an information query is updated each time the query processing server 204 receives a response to this information query from the content provider platform 203.

In order to keep the accuracy metrics adaptable to substantial changes in response data volatility of content provider platforms 203, the accuracy tables may be re-initialized from time to time or, alternatively, they are purged of older values that may not significantly represent the content provider platform's response data volatility any longer. In order to be able to sort out older accuracy values from the accuracy table, a history file is kept which indicates the times and the accuracy of responses received from the content provider platforms 203.

In this manner described by the example of FIG. 7, the query processing server 204 establishes statistics regarding the amount and volatility of the responses received from the content provider platforms 203 which is then leveraged for the generation of cache-based responses having a satisfying level of accuracy. This is now explained by the example of FIG. 8.

FIG. 8 shows another example of an accuracy table relating to cached response data for a particular information query. The table contains an identification of the information query it relates to. The identification may either take the form of an explicit identifier (such as 12345 as indicated by FIG. 8) or a subset of (other) information query fields such as a search string. Furthermore, the cached response data relating to the information query may be stored in the same table or, if the cached response data is stored at another location/table/partition/database, the table may contain a link to the cached response data (while the cached response data also includes a link back to the accuracy table).

Compared to FIG. 7, the accuracy table of FIG. 8 includes further time periods "15-30 min", "30 min-1 h", "1-4 h" and "4-10 h". The query processing server 204 has already received a substantial number of responses to the information query (namely 740 responses) which can be taken from the confidence factor numbers shown in FIG. 8. In the first four time periods until 30 minutes after the last received response, between 160 and 200 responses have been received, respectively, from the content provider platform 203. For the last three time periods between 30 minutes and 10 hours, a considerably smaller number of responses was received by the query processing server 204, namely 10 and 20 responses, respectively. As can also be derived from the table of FIG. 8, the accuracy of the cached response data for that particular information query is relatively high up to the penultimate time period "1-4 h", namely between 99% (in the first time period "0-5 min") and still 92% (in the "1-4 h" time period). In the last time period "4-10 h", the accuracy is considerably lower, namely only 70%. Hence, the accuracy table shown by FIG. 8 defines the probability of the response data conforming to the actual response data at the content provider platform 203 as a step function over periods of time.

As outlined above, the accuracy metrics such as the specific example given by FIG. 8 are utilized when the content provider platform 203 does not respond within the time limit stipulated by the inquiring entity platform 202. Any inquiring entity 202 provides the query processing server 204 with its accuracy requirements such as a threshold value for the accuracy parameter and/or a threshold value for the confidence factor.

For example, an inquiring entity 202 which sends an information query having the ID 12345 (to which the example of FIG. 8 relates) to the query processing server 204 has—at some earlier point of time—deposited its accuracy requirements in the system, accessible to the query processing server 204. The inquiring entity's accuracy requirements may be global, i.e., the same for all information request or information queries and content provider platforms 203 or different for certain information requests, information queries or content provider platforms 203. Thus, for example, the query processing server 204 is connected to a database which includes a partition holding the inquiring entities' accuracy requirements. The information requests and information queries contain an identification of the inquiring entities 202. Alternatively, the inquiring entity 202 includes its accuracy requirements into its information request and information query, respectively.

Thus, in the present example, the inquiring entity directing the information query with the ID 12345 to the query processing server 204 has deposited an accuracy parameter threshold of 95% and a confidence factor threshold of 50 in the aforementioned database coupled to the query processing server 204. The query processing server 204 receiving the information query e.g., at 12:50 on 21 May 2013 initializes a timer to one minute in accordance with the time limit requirements of the inquiring entities (which are, for example, kept the aforementioned database coupled to the query processing server 204 as well) and forwards the information query to the respective content provider platform 203. After the timer has elapsed at 12:51, the query processing server 204 realizes that it does not have received a response so far. Thus, it tries to generate a cache based response. From the time passed since the last response received from the content provider platform 203 at 12:43 (as indicated by FIG. 8), i.e., eight minutes, it determines the "5-10 min" time period as the one to which the information query relates. The query processing server 204 checks the accuracy metrics in the "5-10 min" time period and compares it with the threshold values set by the inquiring entity 202 which it retrieves from the database. It determines that both accuracy values for the information query 12345 are above the inquiring entity's thresholds (98%>95% and 180>50), i.e., the inquiring entity's accuracy requirements are met, retrieves the response data relating to information query 12345 from the cache and generates and forwards, possibly via the distribution unit 206, the cache-based response.

The same inquiring then directs a further information query with ID 12345 to the query processing server 204 at 13:23 on 21 May 2013. Since the query processing server 204 has not received any late response to the inquiring entities' information query and no further information query with the ID 12345 in the meantime, the accuracy table according to FIG. 8 is still unchanged; in particular, the time stamp of 12:43 of the last response received is still valid. Again, the query processing server 204 initializes the timer to one minute, forwards the information query to the content provider platform 203 and waits for a response. For some reason, the timer again elapses at 13:24 without the query processing server 204 having received a response from the content provider platform 203. Again, it therefore tries to generate a response on the basis of the response data for information query ID 12345 stored in the cache 205. The time passed since the last response received amounts to 41 minutes (13:24 minus 12:43). Thus, the query processing server looks into the accuracy data of time period "30 min-1 h" and compares it with the threshold values given by the inquiring entity 202. It determines that although the accuracy parameter threshold of 95% is still just met, the confidence factor of only 20 responses received within the "30 min-1 h" time period is below the threshold of 50. Hence, the query processing server 204 determines that the inquiring entity's accuracy requirements are not met and, instead of generating a cache-based response, it generates and forwards an error message. Alternatively, in other implementations, the query processing server 204 still generates a cache-based response if at least one of the two accuracy threshold values are met.

Figure 9:
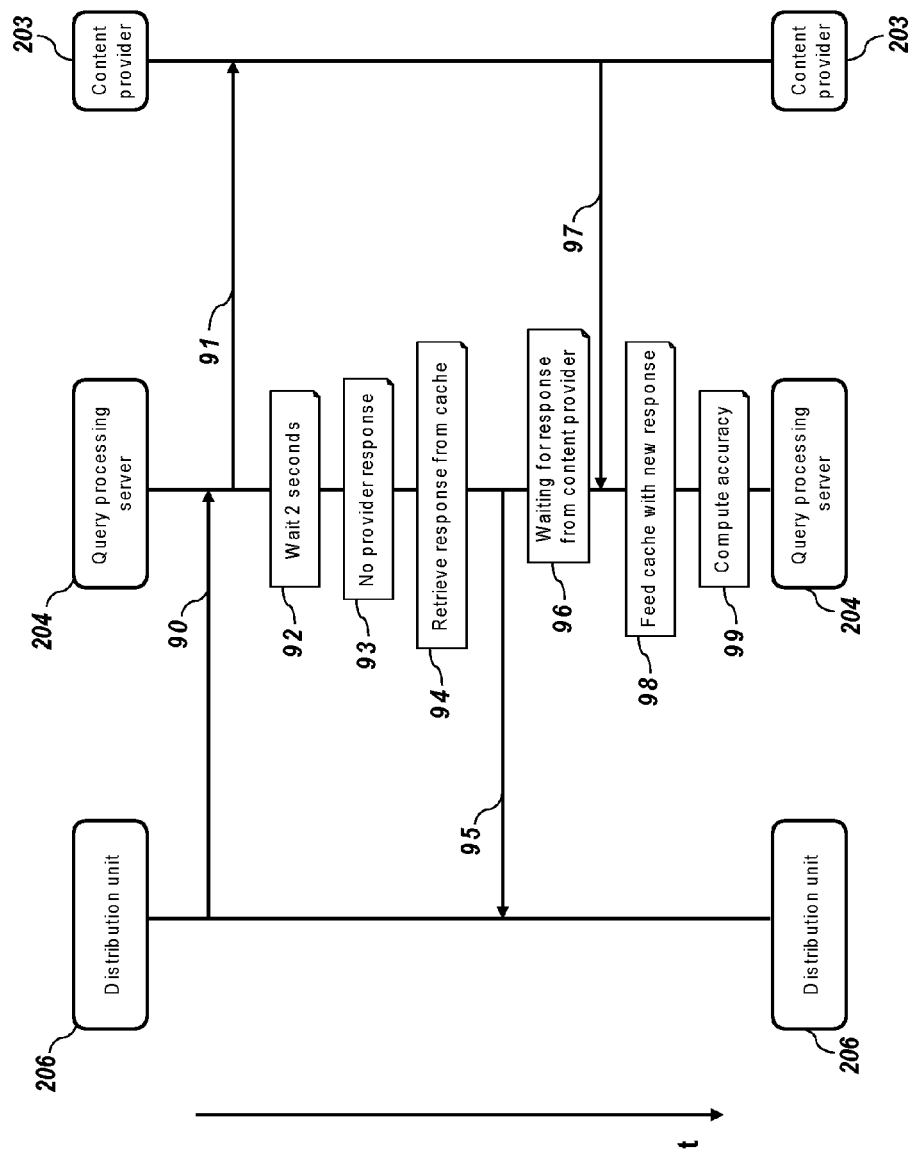
FIGS. 9, 10, and 11 present various message flow scenarios showing the respective behaviour of the query processing server.
Figure 10:
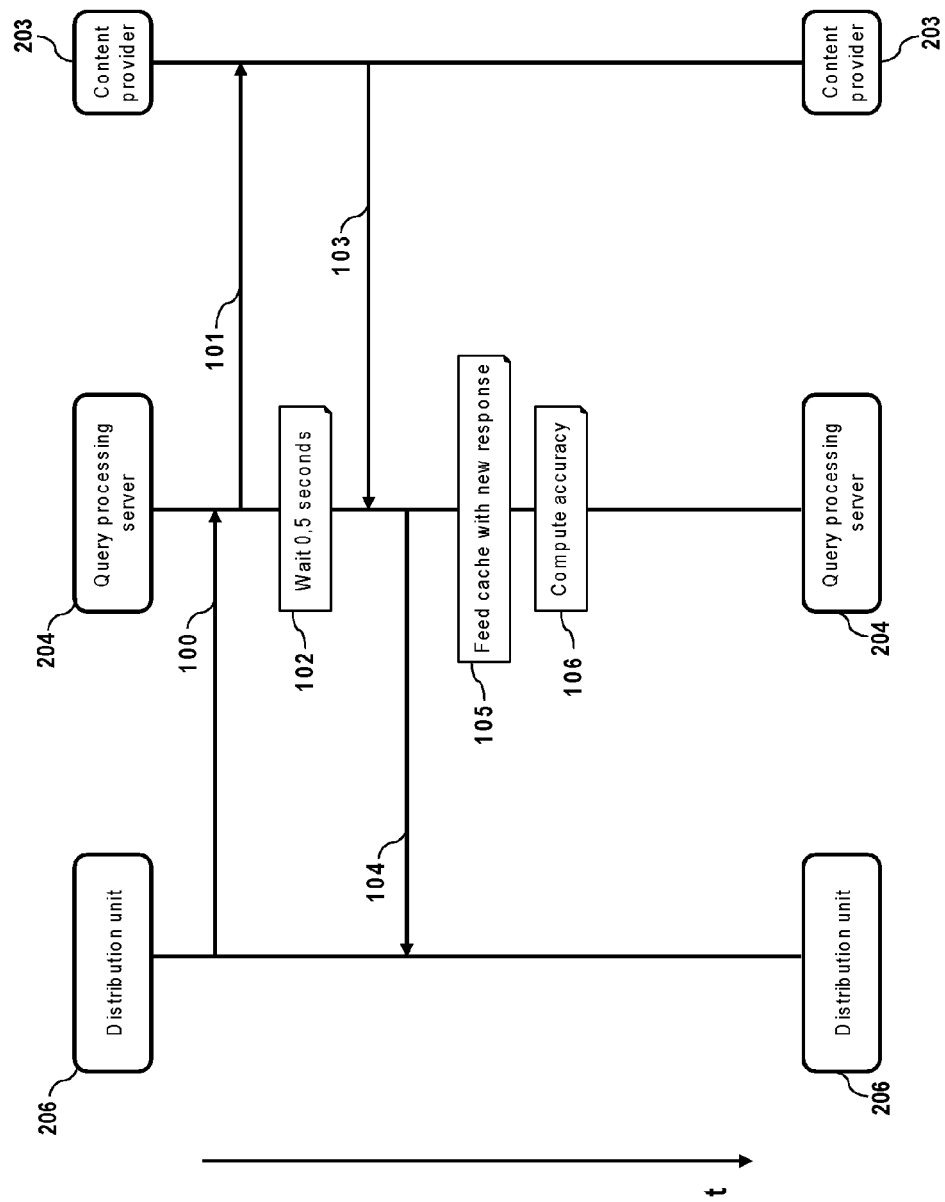
Figure 11:
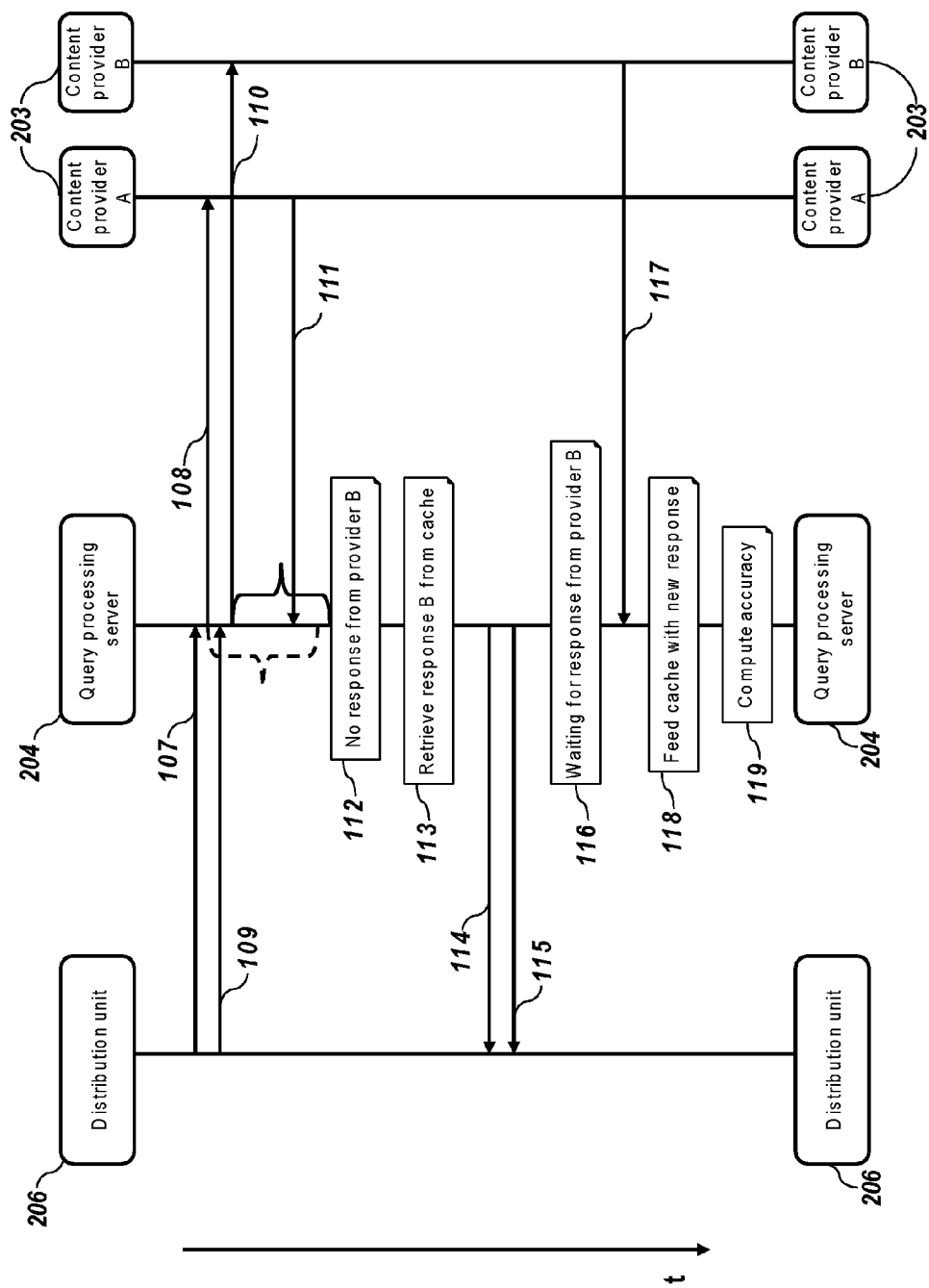

FIGS. 9 to 11 provide further message sequence examples referring to different operation situations of the query processing server 204. For reasons of simplicity, the inquiring entities 202 are not shown by FIGS. 9 to 11. It is, however, assumed that an inquiring entity 202 transmits an information request or information query to the distribution unit 206 and the distribution unit 206 returns the response to the information request or information query back to the inquiring entity 202.

FIG. 9 visualizes the query processing server's behavior in the case of a content provider platform 203 that responds in a non-timely manner to a single provider request after a given time limit. The query processing server 204 receives an information query 90 from the distribution unit 206 and relays it with message 91 to the respective content provider platform 203. The timer was initialized with the value of, e.g., two seconds in accordance with the timing requirement of the inquiring entity being responsible for the information query 90. The query processing server 204 awaits the content provider platform's response at 92 for the two seconds. It then determines at 93 that no response has arrived within the given time and retrieves a response from the cache 205 at 94. The accuracy mechanisms detailed above (e.g., an accuracy of greater than 80% set by the inquiring entity) may be used to verify the quality of cached-based response. The cache-based response, which may be the rate for a car rental matching the information query 90, is forwarded to the distribution unit 206 with message 95 and further on to the inquiring entity 202.

Then, after e.g., ten further seconds have passed during 96, the query processing server receives the content provider platform's response with message 97. This response 97, which may be the rate for a car rental matching the information query 90, is used to update the cache 205. The response 97 is compared to the respective response data stored in the cache 205 and the latter one is updated in the case is it found to be out of date at 98. Optionally, the accuracy metrics are updated as well at 99 (e.g., accuracy parameter, confidence factor and time stamp of the response received, as elaborated above).

Thus, the query processing server 204 returns a timely response to the distribution unit 206 although the content provider platform 203 fails to timely respond. Furthermore, if the optional accuracy mechanisms are implemented, the accuracy requirements of the inquiring entity are met. The lately-arriving response from the content provider platform 203 is still used to keep the cache 205 up to date.

On the other hand, FIG. 10 refers to the behavior of the query processing server 204 in the event of a timely response by the content provider platform 203 in response to a single-provider request. The query processing server 204 receives an information query 100, processes the information query 100 (including timer initialization to e.g., 2 seconds), and forwards the information query 100 to the respective content provider platform 203 with message 101. The content provider platform 203 responds after 0.5 seconds have elapsed at 102 by message 103. Because the response time is less than the given time of 2 seconds, the query processing server 204 forwards the response, which may be the rate for a car rental matching the information query 100, with message 104 to the distribution unit 206 and updates the cache 205 with the possibly changed response data conveyed by the response 103 at 105 and re-computes the response data's accuracy metrics at 106.

In this situation, the inquiring entity's response time limit requirements are met as well, this time by the timely response of the content provider platform 203. The accuracy of the response returned to the inquiring platform 202 is 100%, as the response actually originates from the content provider platform 203. On the other hand, the query processing server 204 still utilizes the content provider platform's response to keep the cache 205 up to date so that e.g., in the event the content provider platform 203 experiences outages, server instabilities, overloads etc. the query processing server 204 is able to generate a timely response being as accurate as possible from the cache 205.

In this example, the primary constraint may be considered to be the response time with the accuracy of the response having a lesser importance as a constraint. This type of process flow may apply to retrieving information for displaying rental car advertisments intended to attract a potential booking for the host for the distributed information processing system, the customer of the host, and the rental car company in an instance in which a delayd response is received from the content provider platform 203 (FIG. 9) or in an instance in which a timely response is received from the content provider platform 203 (FIG. 10).

FIG. 11 pertains to a multi-provider request and visualizes the query processing server's operation in a mixed situation of one timely and one delayed response from the content provider platforms 203.

The query processing server 204 receives two information queries 107, 109 from the distribution unit 206. Beforehand, the distribution unit 206 has received a multi-provider information request from one of the inquiring entities and has decomposed this information request into these two information queries 107, 109. In one implementation, the query processing server 204 handles these two information queries 107, 109 as separate information queries as it is unaware that the information queries 107, 109 belong to the same multi-provider information request. Hence, the query processing server 204 starts a timer (initialized to e.g., one second) monitoring the response to information query 107 in accordance with the inquiring entity's time limit requirements deposited in the system accessible to query processing server 204 or contained in the information request and the information query 107 and forwards the information query with message 108 to the content provider platform A. It similarly handles the information query 109, i.e., starts the timer (initialized to e.g., one second as well) and relays the information query with message 110 to content provider platform B.

The query processing server 204 then receives the response 111 to message 108 from content provider A still within the one-second time limit (which is indicated in FIG. 11 by the dashed curly bracket). On the other hand, no response it received from content provider platform B within the one-second time limit observing a response to message 110 (this second time limit is indicated in FIG. 11 by the continuous curly bracket). The query processing server 204 determines the absence of a response from content provider platform B at 112 and instead retrieves a response from the cache 205 at 113. Both, the response from content provider platform A and the cache-based response replacing the absent response from content provider platform B are forwarded to the distribution unit 206 with messages 114 and 115. Distribution unit 206 then re-composes the responses 114, 115 into a combined response to the original information request and returns this combined response to the inquiring entity 202. In an alternative implementation, the transmission of the content provider platform A's response in form of message 114 takes place immediately after the response 111 has reached the query processing server 204, i.e., before activity 112.

The query processing server 204 then still waits for the response from content provider platform B (of course, query processing server 204 might perform concurrent operations e.g., relating to other information queries during that waiting time) at 116. The response 117 then eventually arrives at the query processing server 204. The query processing server 204 updates the cache 205 in view of this response at 118, i.e., it checks whether an addition or change of the cached response data reflecting the information query response 117 in the cache is necessary and, if affirmative, performs the addition and change of the response data, respectively. At 119, it further re-computes the accuracy metric of the cached information query response data.

In this manner, the operation of the query processing server 204 serves the inquiring entity's information request in form of the decomposed information queries 107, 109 in an optimized way. The timely response 111 from content provider platform A is returned within the inquiring entity's time limit requirements at an accuracy of 100%. The missing response from content provider platform B is replaced by a cached-based response which is also returned within the inquiring entity's time limit requirements at an accuracy level that is still acceptable for the inquiring entity 202. The overall recombined response to the information request can be formed by the distribution unit 206 within the inquiring entity's time expectations and returned to the inquiring entity 202. Thus, the lately arriving response 117 from content provider platform B does not defer the overall response to the inquiring entity's information request formed by the distribution unit 206.

Figure 12:
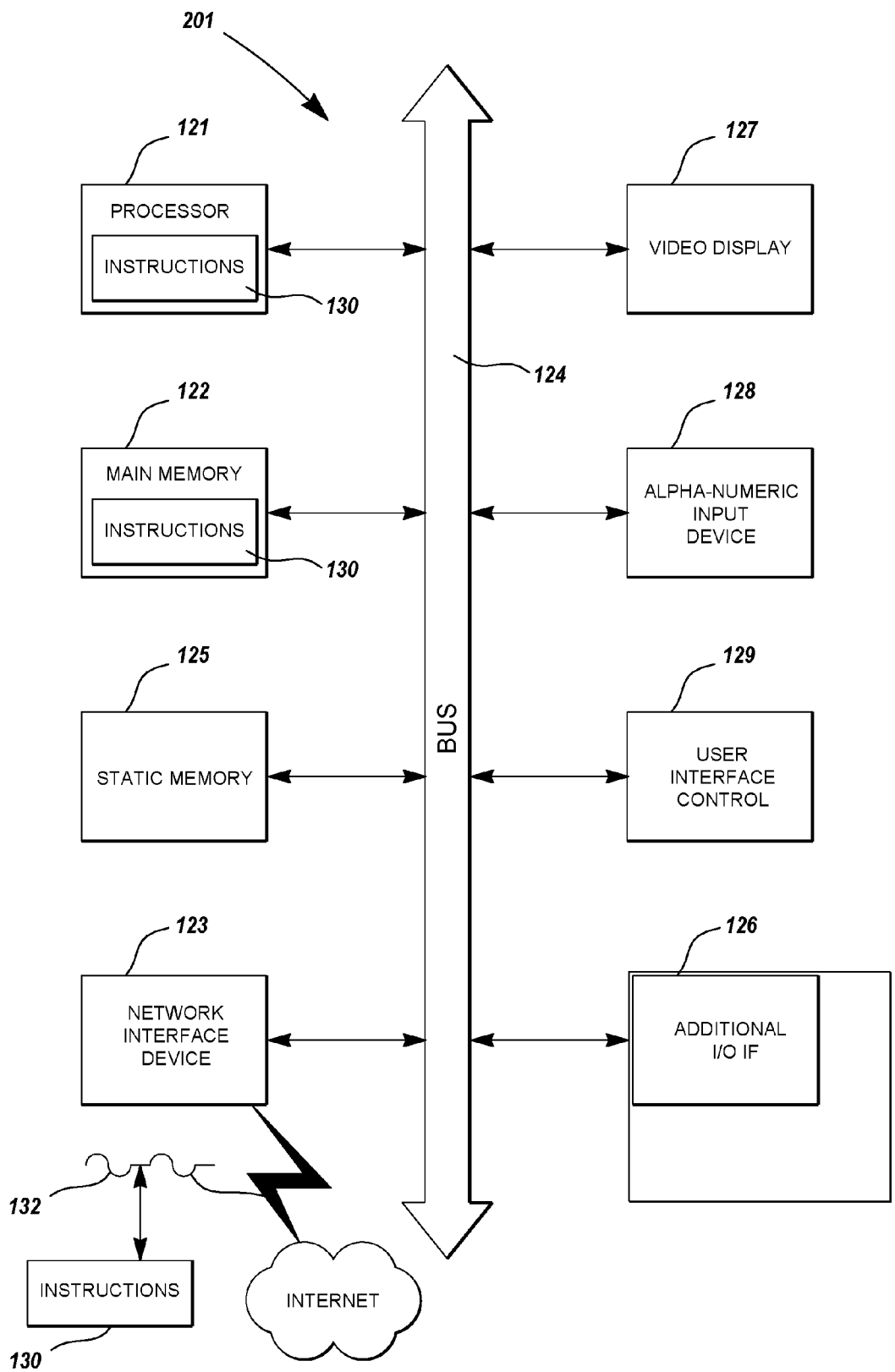
FIG. 12 is an exemplary schematic view of the internal architecture of the query processing server.

Finally, FIG. 12 is a diagrammatic representation of the internal structure of query processing server 204. The query processing server 204 is arranged to execute a set of instructions, to cause it to perform any of the methodologies discussed herein. The mobile communication device includes a processor 121, a main memory 122 and a wireless network interface 123 (such as a Wi-Fi and/or Bluetooth interface) and/or a 2G/3G/4G mobile network interface device, all of which communicate with each other via a bus 124. It further includes a static memory 125, e.g., non-removable flash and/or solid state drive and/or a removable Micro or Mini SD card, which permanently stores the software enabling the query processing server 204 to execute its functions including timer initialization, generation of cache-based responses, cache and accuracy update, etc. and to communicate with the inquiring entities 202, the distribution unit 206 and the content provider platforms 203 and, optionally, to other local hosts within a local area network. Furthermore, it includes a display 127, a user interface control module 129 and an alpha-numeric and cursor input device 128. The wired and/or wireless network interface device 123 connects the query processing server 204 to inquiring entities 202 (via distribution unit 206, if present), the distribution unit 206 and the content provider platforms 203 and, optionally, to local hosts within a local area network. Optionally, additional I/O interfaces 126 such as card reader and USB interfaces may be present. An executable set of instructions (i.e., software) 130 embodying any one, or all, of the methodologies described above, resides completely, or at least partially, permanently in the non-volatile memory 125. When being executed, respective process data resides in the main memory 122 and/or the processor 121. The software 130 may further be transmitted or received as a propagated signal 132 through the wired or wireless network interface device 123 from/to a software server within the local area network or the Internet.

The other computer hosts mentioned herein such as the inquiring entities 202, the distribution unit 206 and the content provider platforms 203 are constructed in a similar way.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method of handling a shopping request at a travel reservation system, the method comprising:
   receiving the shopping request from an inquiring entity at a query processing server of the travel reservation system;
   directing the shopping request from the query processing server to a first platform of a first travel content provider;
   if the query processing server receives a first response to the shopping request from the first platform within a given time limit, forwarding the first response from the query processing server to the inquiring entity;
   if the first platform fails to respond to the query processing server within the given time limit, forwarding a second response to the shopping request from the query processing server to the inquiring entity based upon query response data stored in a cache at the query processing server; and
   if the query processing server receives a third response to the shopping request from the first platform after the given time limit has been exceeded, updating the query response data for the first travel content provider in the cache at the query processing server based upon the third response.

2. The method of claim 1 further comprising:
   maintaining an accuracy metric for the query response data in the cache at the query processing server,
   wherein forwarding the second response to the shopping request from the query processing sever to the inquiring entity based upon the query response data stored in the cache at the query processing server comprises:
   determining whether the accuracy metric meets a given accuracy threshold;
   in response to determining that the accuracy metric meets the given accuracy threshold, determining one or more available options from the query response data; and
   forwarding the second response from the query processing server to the inquiring entity, the second response being based on the determined one or more available options.

3. The method of claim 2 further comprising:
   setting the given accuracy threshold according to a plurality of first accuracy requirements provided in the shopping request received from the inquiring entity.

4. The method of claim 2, wherein forwarding the second response to the shopping request from the query processing sever to the inquiring entity based upon the query response data stored in the cache at the query processing server further comprises:

in response to determining that the accuracy metric fails to meet the given accuracy threshold, forwarding an error message from the query processing server to the inquiring entity.

5. The method of claim 2 wherein updating the query response data for the first travel content provider in the cache comprises:
updating the accuracy metric of the query response data in the cache at the query processing server.

6. The method of claim 2, wherein the accuracy metric of the query response data in the cache includes a plurality of accuracy values relating to a plurality of time intervals, and each accuracy value indicates an accuracy level of the query response data in the cache for the corresponding time interval, and determining whether the accuracy metric meets the given accuracy threshold comprises:
determining a particular time interval of the plurality of time intervals based upon a time of the last cache update relating to the query response data; and
comparing the accuracy value of the particular time interval with the given accuracy threshold.

7. The method of claim 1 wherein the given time limit is set according to a plurality of time limit requirements provided in the shopping request sent by the inquiring entity.

8. The method of claim 1 wherein the query processing server has access to a time limit table, the time limit table including time limit requirements for the inquiring entity, and the shopping request includes an identity of the inquiring entity, and further comprising:
upon receiving the shopping request, initiating the given time limit at the query processing server in accordance with the time limit requirements of the inquiring entity matching the identity in the shopping request.

9. The method of claim 1 wherein updating the query response data for the first travel content provider in the cache comprises:
adding to the cache a time at which the third response is received by the query processing server; and
either adding the query response data for the first travel content provider from the third response to the cache if the cache lacks prior query response data relating to the shopping request or changing the query response data according to the third response if the query response data in the cache and relating to the shopping request does not correspond to the third response.

10. A system configured to handle a shopping request at a travel reservation system, the system comprising:
a processor;
a cache coupled with the processor; and
a memory coupled with the processor, the memory including instructions that, when executed by the processor, cause the system apparatus to:
receive the shopping request from an inquiring entity;
direct the shopping request to a first platform of a first travel content provider; if a first response to the shopping request is received from the first platform within a given time limit, forward the first response to the inquiring entity;
if the first platform fails to respond to the query processing server within the given time limit, forward a second response to the shopping request to the inquiring entity based upon query response data stored in the cache; and
if a third response to the shopping request is received from the first platform after the given time limit has been exceeded, update the query response data for the first travel content provider in the cache based upon the third response.

11. The system of claim 10 wherein the instructions, when executed by the processor, further cause the system to:
maintain an accuracy metric for the query response data in the cache,
wherein the instructions cause the system to forward the second response to the shopping request to the inquiring entity based upon the query response data stored in the cache by causing the system to:
determine whether the accuracy metric meets a given accuracy threshold;
in response to determining that the accuracy metric meets the given accuracy threshold, determine one or more available options from the query response data; and
forward the second response from the query processing server to the inquiring entity, the second response being based on the determined one or more available options.

12. The system of claim 11 wherein the instructions, when executed by the processor, further cause the system to:
set the given accuracy threshold according to first accuracy requirements provided in the shopping request received from the inquiring entity.

13. The system of claim 11 wherein the instructions further cause the system to forward the second response to the shopping request to the inquiring entity based upon the query response data stored in the cache by causing the system to:
in response to determining that the accuracy metric fails to meet the given accuracy threshold, forward an error message from the query processing server to the inquiring entity.

14. The system of claim 11 wherein the instructions cause the system to update the query response data for the first travel content provider in the cache based upon the third response by causing the system to:
update the accuracy metric of the query response data in the cache.

15. The system of claim 11, wherein the accuracy metric of the query response data in the cache includes a plurality of accuracy values relating to a plurality of time intervals, and each accuracy value indicates a level of accuracy of the query response data in the cache for the corresponding time interval, and the instructions cause the system to determine whether the accuracy metric meets the given accuracy threshold by causing the system to:
determine a particular time interval of the plurality of time intervals based upon a time of the last cache update relating to the query response data; and
compare the accuracy value of the particular time interval with the given accuracy threshold.

16. The system of claim 10 wherein the given time limit is set according to a plurality of time limit requirements provided in the shopping request sent by the inquiring entity.

17. The system of claim 10, wherein the shopping request includes an identity of the inquiring entity, and further comprising:
a time limit table in the memory, the time limit table including a plurality of time limit requirements for the inquiring entity.

18. The system of claim 17 wherein the instructions, when executed by the processor, further cause the system to:

upon receiving the shopping request, initiate the given time limit in accordance with the time limit requirements of the inquiring entity matching the identity in the shopping request.

19. The system of claim 10 wherein the instructions cause the system to update the query response data in the cache for the first travel content provider based upon the third response by causing the system to:

add to the cache a time when the third response is received by the system; and either add the query response data for the first travel content provider from the third response to the cache if the cache lacks prior query response data relating to the shopping request or change the query response data according to the third response if the query response data in the cache and relating to the shopping request does not correspond to the third response.

20. A computer program product comprising:
a non-transitory computer readable storage medium; and
instructions stored on the computer readable storage medium that, when executed by a processor of a query processing server, cause the processor to:
receive a shopping request from an inquiring entity;
direct the shopping request to a platform of a travel content provider;
if a first response to the shopping request is received from the platform within a given time limit, forward the first response to the inquiring entity;
if the platform fails to respond within the given time limit, forward a second response to the shopping request to the inquiring entity based upon query response data stored in a cache; and
if a third response to the shopping request is received from the platform after the given time limit has been exceeded, update the query response data for the travel content provider in the cache based upon the third response.

* * * * *